United States Patent [19]

Urich

[11] 4,214,277
[45] Jul. 22, 1980

[54] HALFTONE IMPLEMENTATION APPARATUS

[75] Inventor: George H. Urich, Penfield, N.Y.

[73] Assignee: Xerox Corporation, Stamford, Conn.

[21] Appl. No.: 8,731

[22] Filed: Feb. 2, 1979

[51] Int. Cl.$^2$ .............................................. H04N 1/40
[52] U.S. Cl. .................................................. 358/283
[58] Field of Search ................................ 358/284, 298

[56] References Cited

U.S. PATENT DOCUMENTS

| 3,977,007 | 8/1976 | Berry ..................................... 358/283 |
| 4,150,401 | 4/1979 | Yamamoto ........................... 358/283 |

Primary Examiner—Howard W. Britton
Attorney, Agent, or Firm—Franklyn C. Weiss

[57] ABSTRACT

A scanned raster is divided into halftone cells that are, for example, four by four picture elements (pixels) in size, i.e., it takes sixteen picture elements to make one halftone cell. The tone is determined by summing a different and predetermined threshold value for each of the picture elements that comprise a halftone cell. Each of these signals is then sliced at a predetermined value; if the sum of the threshold and the video value is higher than the slicing level, the picture element is transmitted as a "1", and if below the slicing level, it is sent as a "0".

10 Claims, 5 Drawing Figures

|    | E0 | E1 | E2 | E3 |
|----|----|----|----|----|
| L0 | 6  | 5  | 4  | 15 |
| L1 | 7  | 0  | 3  | 14 |
| L2 | 8  | 1  | 2  | 13 |
| L3 | 9  | 10 | 11 | 12 |

*FIG. 1A*

|    | E0 | E1 | E2 | E3 |
|----|----|----|----|----|
| L0 | 0  | 8  | 2  | 10 |
| L1 | 12 | 4  | 14 | 6  |
| L2 | 3  | 11 | 1  | 9  |
| L3 | 15 | 7  | 13 | 5  |

HALFTONE IMPLEMENTATION APPARATUS

BACKGROUND OF THE INVENTION

The technique of representing a continuous tone image by use of black and white levels only, so that the eye perceives a gray image, is known as "halftone". This technique is used extensively in newspaper reproduction of photographs, for example, whereby the representation of an image with actual levels of gray would be very difficult and expensive. Because a newspaper comprises a two-level graphic representation of information, that is, there is either ink on the page or there is no ink on the page, the prior art has extensively disclosed the halftoning technique whereby a photograph, for example, can be represented by various size dots which when viewed by the eye, is seen as a gray scale photograph. That is, the human eye, being a natural integrator, integrates the various size dots into an interpreted continuous gray scale, if such was present on the original photograph.

Many techniques have been developed in the art for generation and processing of halftone images. Improvements in the prior art are always sought because of budget considerations, accuracy of representation, etc.

SUMMARY OF THE INVENTION

The present invention provides a halftoning implementation technique whereby the halftoning is carried out by dividing analog picture elements into a M×N (e.g., 4×4) matrix of subelements which are serially summed with a threshold voltage which varies as a function of the matrix position. The subelements are, in turn, transmitted as black or white (i.e., "1" or "0") depending on whether the sum is above or below a predetermined slicing level. The matrix is separated into the 16 picture elements, commonly known as pixels, with one of 16 slicing or threshold levels in each of the 16 pixels. The halftone cells, comprising the 16 pixels, are repeated across and down the page as the circuit, to be herein described below, transforms the analog input picture signal into an output, and now digital, halftone signal.

OBJECTS OF THE PRESENT INVENTION

It is, therefore, an object of the present invention to utilize a predetermined halftone picture cell comprising a matrix of picture elements in which a predetermined scanned raster is utilized to convert an analog picture signal into a digital, halftone, picture signal.

It is another object of the present invention to utilize predetermined threshold levels in a scanned raster whereby signals above a predetermined video level will be transmitted as black (or white) and signals below the threshold level will be transmitted as white (or black), the black or white signal being defined by the circuit itself.

It is a further object of the present invention to provide a halftone implementation technique by utilizing a circuit which will electrically divide input picture element information from a scanned raster into halftone cells and generate a two-level digital signal comprising black or white information which is directly related to the input gray level information of the picture signal itself.

DESCRIPTION OF THE DRAWINGS

For a more complete understanding of the invention as well as other objects and further features thereof, reference may be had to the following detailed description of the invention in conjunction with the drawings wherein:

FIG. 1 is a representative diagram of a halftone cell comprising a 4×4 picture element (pixel) matrix, wherein FIG. 1A is a conventional threshold level representation while FIG. 1B is another possible threshold level representation;

FIG. 3 is a truth table for the logical operation of the Line and Element Counters as seen in FIG. 2.

DETAILED DESCRIPTION OF THE INVENTION

Figure 2A:
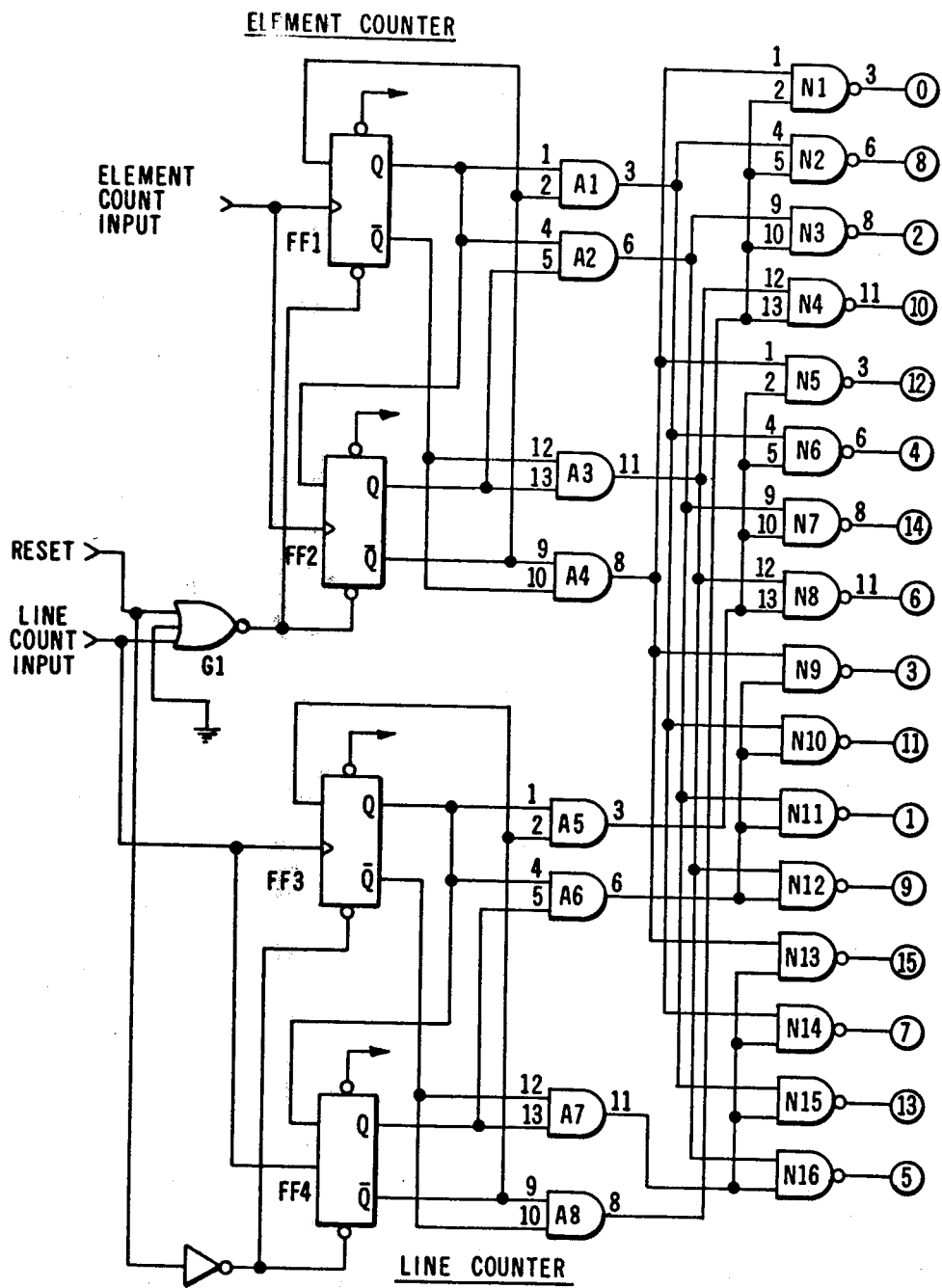
FIGS. 2a and 2b comprise a schematic representation of the circuit utilized to perform the analog to halftone signal conversion.

As set forth previously, halftoning techniques are well known in the prior art. Newspaper, magazine, and other items utilize halftone techniques for gray scale representation by black and white printed information. Many implementations of halftone techniques are known in the prior art but the present implementation is an improvement over these prior art techniques.

The present invention relates to a graphic scanned raster which is divided into halftone cells that are, for example, 4×4 picture elements (pixels) in size. That is, it takes 16 pixels to make one halftone cell. The tone itself is determined by summing a different and predetermined threshold value for each of the picture elements in the matrix that comprises the halftone cell. Each of these signals is then sliced at a predetermined level; if the sum of the threshold and video value is higher than the slicing level, the picture element is transmitted as a binary "1", and if below the slicing level, it is sent as a binary "0".

The actual configuration of the threshold matrix can vary in accordance with the principles of the present invention. FIG. 1A shows a conventional threshold matrix while FIG. 1B shows another or "optimum" threshold matrix. E0, E1, E2, and E3 are four consecutive picture elements (pixels), and L0, L1, L2, and L3 are four consecutive lines in a scanned raster. The E & L patterns are repetitive across and down the page respectively, so that the scanning pattern will be repeated as often as determined by the width and length of the scanned page. The E's may be interpreted as the remainder resulting from the division of the total number of picture elements by 4. Similarly, the L's may be interpreted as the remainder resulting from the division of the number of lines on the page by 4. Thus, at line 0, the threshold levels for pixels E0, E1, E2, and E3 would be 6, 5, 4, 15 and repeated continuously across the page if the threshold matrix and threshold levels are as set forth in FIG. 1A. The next scan line or line L1 would start with threshold levels 7, 0, 3, and 14, which are repeated as often as required by the width of the scanned page. Line L2 and line L3 with the patterns as set forth in FIG. 1A would also be scanned continuously at these threshold levels across the page as required by the width of the page as set forth before. After scan line L3 is scanned, the pattern for line L0 would begin the matrix all over again.

In the facsimile transmission technology, the scan resolution is sometimes discussed as, for example, 396 bits per inch, or stated another way, 396 lines per inch. Utilizing this number as an example, with the halftone cells set forth in FIG. 1, there would be, per inch, 99 halftone cells in the vertical direction along a facsimile scanned document; and if the horizontal resolution was the same, there would be 99 halftone cells in the horizontal direction as well. Thus, for one square inch of a document in, for example, a facsimile scanned document there would be 9801 halftone cells per square inch with an accompanying 156,816 pixels in the same square inch.

Figure 2B:
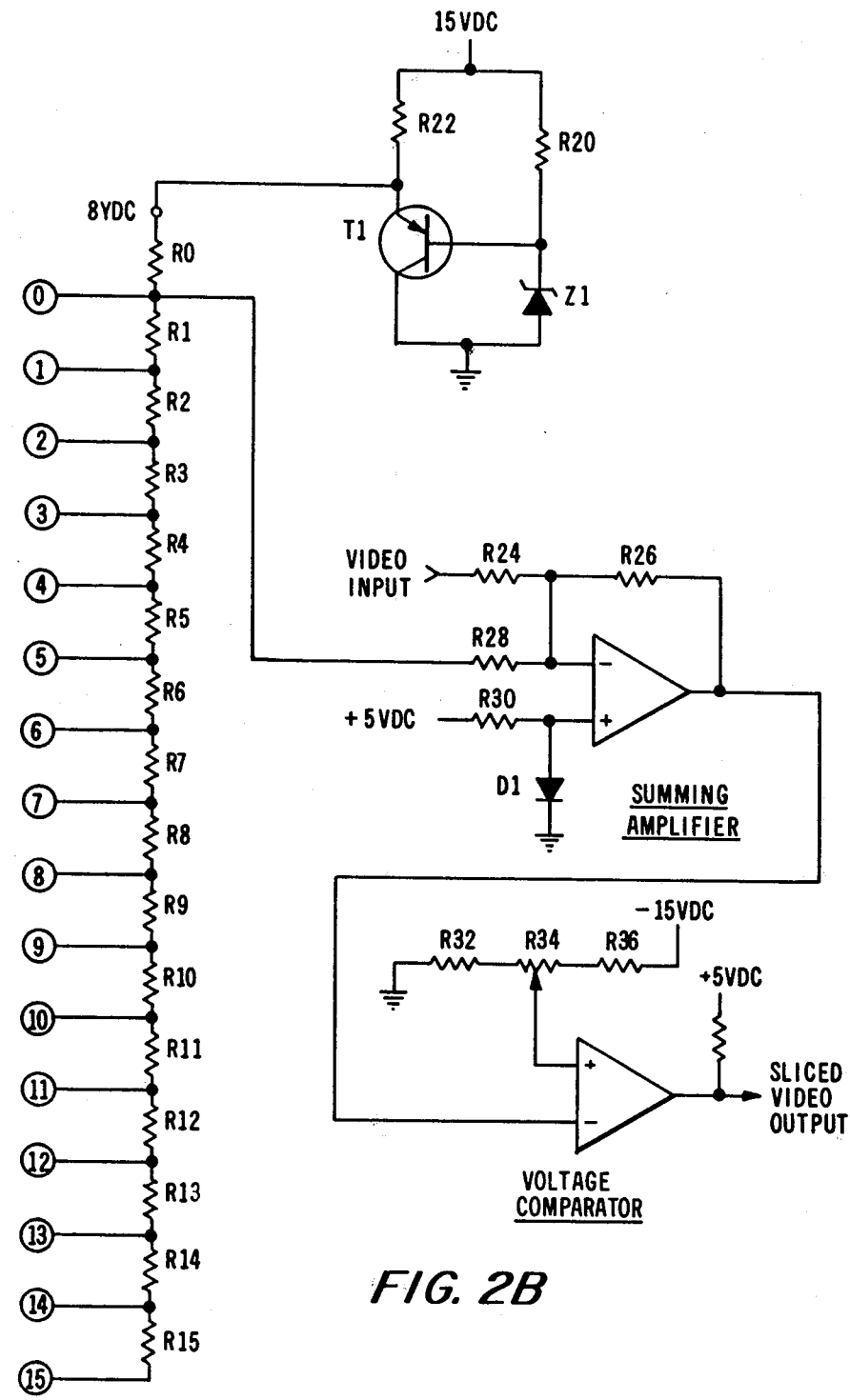

Referring now to FIG. 2, this circuit shows the embodiment of the present invention in converting the 4×4 pixel matrix into halftone binary signals representing the gray scale information. The circuit shown therein consists essentially of two fourstate gray counters, opencollector logic gates, a voltage divider, and an analog voltage summer. The two fourstate gray counters comprise the element counter which consists of flip-flop FF1 and flip-flop FF2. The line counter comprises flipflop FF3 and flip-flop FF4. The opencollector logic gates comprise NAND gates N1 through N16. The voltage divider comprises resistors R0 through R15 with the analog voltage summer comprising the summing amplifier and the voltage comparator seen in FIG. 2.

The element counter consists of the two flip-flops FF1 and FF2 and four two-input AND gates A1 through A4. The line counter consists of the same circuit elements, that is, flip-flops FF3 and FF4 and four two-input AND gates A5 through A8. In the reset or start condition, both the element counter and the line counter are in the 00 state. The 00 refers to the Q outputs of the flip-flops comprising the counters. Output Q in flip-flops FF1 and FF3 are the least significant bits and output Q in flipflops FF2 and FF4 are the most significant bits. When the counters are in state 00, the outputs from AND gates A4 and A8 are high, all others are low. The counters advance repetitively through the pattern shown in FIG. 3 with each clock pulse. The element counter is driven by the element count input which is a counter signal synchronized with the scanned raster to deliniate each pixel. The line counter is driven by the line count input signal or by a sync signal coordinated with the retrace aspect of a scanned raster. The outputs from AND gates A1 through A4 of the element counter and the outputs of AND gates A5 through A8 are "NANDED" together by NAND gates N1 through N16 in the pattern set forth in FIG. 2 to select various open collector gates at the outputs of the various NAND gates.

The 16 open collector outputs from NAND gates N1 through N16 are then connected (jumpered) to the 16 taps as numbered of the voltage divider comprising resistors R0 through R15. Which outputs are connected to which taps of the voltage divider is a function of the threshold matrix being implemented. FIG. 2 shows the implementation of the other or "optimum" threshold matrix where all like numbers must be jumpered or wired together.

An 8 volt, for example, potential is applied to the voltage divider by the circuit comprising transistor T1, Zener diode Z1 and resistors R20 and R22 connected to an input voltage of 15 volts DC. 8 volts was chosen as it represents the highest video level in one particular circuit reviewed. The voltage divider comprising resistors R0 through R15 is set up to yield half volt steps as consecutive pins are grounded through the open collector gates of NAND gates N1 through N16. The summing voltages generated as the pins are driven to ground are shown in the following table:

| Pin on Voltage Divider | Summing Voltage |
|---|---|
| 0 | 0 |
| 1 | 0.5 |
| 2 | 1.0 |
| 3 | 1.5 |
| 4 | 2.0 |
| 5 | 2.5 |
| 6 | 3.0 |
| 7 | 3.5 |
| 8 | 4.0 |
| 9 | 4.5 |
| 10 | 5.0 |
| 11 | 5.5 |
| 12 | 6.0 |
| 13 | 6.5 |
| 14 | 7.0 |
| 15 | 7.5 |

The summing voltage is then applied to the summing amplifier which has as its inputs resistor R30 and diode D1 coupled to a 5 volt power supply, resistor R28 coupled to the summing voltage divider and resistors R24 and R26 connected as shown to receive the actual video input signal. The output of the summing amplifier is coupled to the input of the voltage comparator which comprises resistors R32, R34, and R36 coupled to a minus 15 volts DC source. The actual slicing level is adjusted by the potentiometer R34 which could be a 2000 ohm potentiometer. The output of the voltage comparator is the actual sliced video signal comprising binary "1" or binary "0" which makes up the halftone signal as set forth previously.

Figure 3:
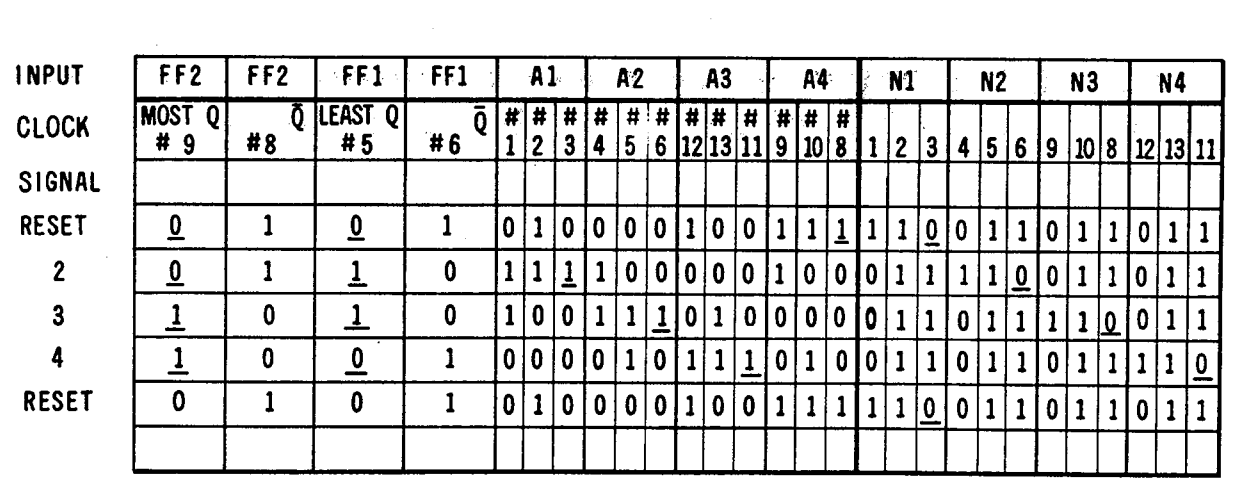

Referring now to FIG. 3, therein is disclosed and shown the logic delineation of the outputs of the various circuit devices. In a reset condition the Q output of flip-flop FF2 would be a logic 0 while the notQ output of flip-flop FF2 would be a logic 1. The least significant digit Q of flip-flop FF1 would be a logic 0 while the notQ output of flip-flop FF1 would also be a logic 1. At this time, the signals relating to AND gate A1 would be: input 1 equalling logic 0, input 2 equalling logic 1, and output 3 equalling logic 0. AND gate 2 would involve: input 4 equalling logic 0, input 5 equalling logic zero, and output 6 equalling logic 0. AND gate A3 would involve: input 12 equalling logic 1, input 13 equalling logic 0, and output 11 equalling logic 0. AND gate A4 would involve: input 9 equalling logic 1, input 10 equalling logic 1, and output 8 equalling logic 1. Thus, for the reset condition, the most significant digit, FF2, is logic 0, the least significant digit, FF1, is logic 0 while the output of AND gate A4 is logic 1. With the outputs of AND gates A1 through A4 as shown in FIG. 3 for the reset condition, NAND gate N1 would involve: input 1 being a logic 1, input 2 being a logic 1, and output 3 being a logic 0. This continues on for NAND gates N1 through N4 as shown in FIG. 2. Thus, if the logic progression of FIG. 2 is followed through, as seen in FIG. 3, the various NAND gates can be seen to be enabled with the matrix sequence so as to each have an "open collector". Thus, for the reset condition NAND gate N1 will be energized, for the first count NAND gate N2 will be energized, for the second count NAND gate N3 will be energized, for the third count NAND gate N4 will be energized in the progression 0, 8, 2, 10 as seen on line 0, of FIG. 1B. The 0, 8, 2, 10 configuration is transferred by the "jumpers" to the voltage divider to allow the various threshold voltages to be applied to the summing amplifier shown in FIG. 2.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. An electrical circuit for generating halftone image signals in accordance with an input analog image signal comprising:

first counter means for generating an element count signal representative of halftone image elements to be generated, second counter means for generating a line count signal representative of each line of halftone image elements to be generated, said element and line count signals therefore comprising M×N picture elements in a plurality of halftone cells, said halftone cells being repetitive throughout said analog image, logic circuit means coupled to said first and second counter means for generating enabling signals in accordance with a predetermined pattern, said pattern determining the sequence of conversion of said analog image signal to halftone image signals within each of said halftone cells, matrix circuit means coupled to said logic circuit means for generating predetermined voltage level signals in said predetermined pattern, summing circuit means for summing said predetermined voltage level signals with the input analog image signal, and comparator circuit means coupled to said summing circuit means for generating a first digital signal if said summed signal is greater than a predetermined threshold voltage level and for generating a second digital signal if said summed signal is less than said predetermined threshold voltage level.

2. The electrical circuit as set forth in claim 1 wherein said matrix circuit is adapted for selective coupling to said logic circuit means in different sequences to thereby establish different predetermined patterns of voltage level signals.

3. The electrical circuit as set forth in claim 1 wherein said comparator circuit means further includes means for generating threshold voltage levels, said levels being adjustable to vary the level within predetermined limits.

4. The electrical circuit as set forth in claim 2 wherein said matrix circuit comprises:

a voltage divider circuit including means for generating a D.C. voltage, and a plurality of resistors in series with said voltage generating means, said resistors having connections between them to said logic circuit means to generate said predetermined patterns of voltage level signals to be applied to said summing circuit means as each of said resistor connections are selectively grounded by operation of said logic circuit means.

5. In an imaging system, apparatus for generating halftone signals in relation to an applied scanned raster analog signal comprising:

first circuit means for generating count signals representative of halftone cells comprising M×N picture elements, said halftone cells being repetitive throughout the entire image being scanned, second circuit means coupled to said first circuit means for generating enabling signals in accordance with a predetermined pattern, said pattern determining the sequence of conversion of said analog signal to halftone signals within each of said halftone cells, third circuit means coupled to said second circuit means for summing the signals generated by said second circuit means with the applied scanned raster analog signal, and fourth circuit means coupled to said third circuit means for generating a first binary signal if said summed signal is greater than a predetermined threshold voltage level and for generating a second binary signal if said summed signal is less than said predetermined threshold voltage level.

6. The apparatus as set forth in claim 5 wherein said first circuit means comprises:

first counter means for generating an M element count signal representative of halftone image elements to be generated, and second counter means for generating an N line count signal representative of each line of halftone image elements to be generated.

7. The apparatus as set forth in claim 6 wherein said second circuit means comprises:

logic circuit means coupled to said first and second counter means for generating said enabling signals, and matrix circuit means coupled to said logic circuit means for generating predetermined voltage level signals in said predetermined pattern.

8. The apparatus as set forth in claim 7 wherein said matrix circuit is adapted for selective coupling to said logic circuit means in different sequences to thereby establish different predetermined patterns of voltage level signals.

9. The apparatus as set forth in claim 8 wherein said matrix circuit comprises:

a voltage divider circuit including means for generating a D.C. voltage, and a plurality of resistors in series with said voltage generating means, said resistors having connections between them to said logic circuit means to generate said predetermined patterns of voltage level signals to be applied to said summing circuit as each of said resistor connections are selectively grounded by operation of said logic circuit means.

10. The apparatus as set forth in claim 7 wherein said fourth circuit means comprises:

summing circuit means for summing said predetermined voltage level signals with the input analog image signals, and comparator circuit means coupled to said summing circuit means for generating a first digital signal if said summed signal is greater than a predetermined threshold voltage level and for generating a second digital signal if said summed signal is less than said predetermined threshold voltage level.

* * * * *